June 20, 1967 — W. H. HALL — 3,326,513
MEANS FOR INTERCONNECTING VALVE MEMBERS
Filed Nov. 10, 1964 — 4 Sheets-Sheet 1
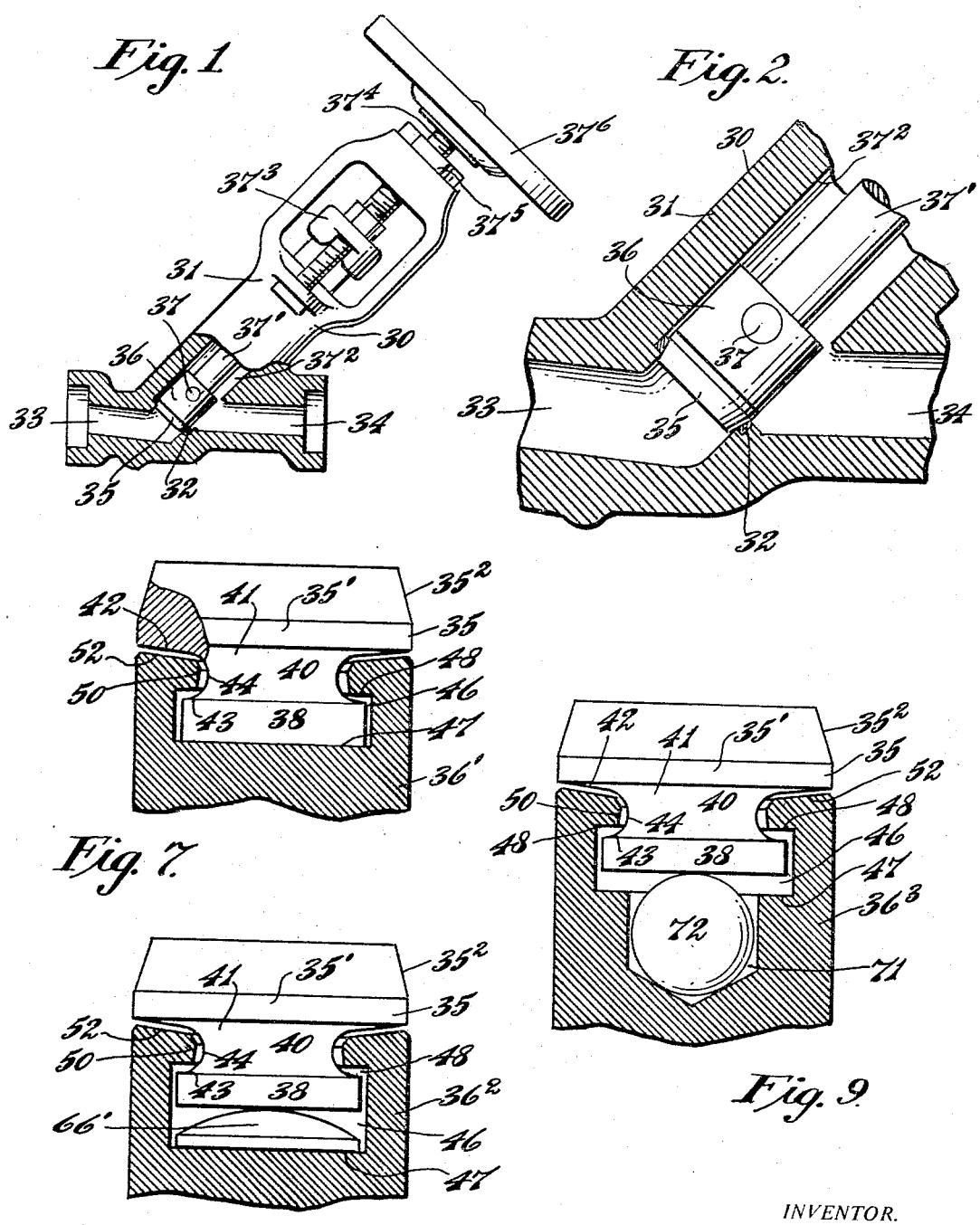
INVENTOR.
WALTER H. HALL

INVENTOR.
WALTER H. HALL
ATTORNEYS

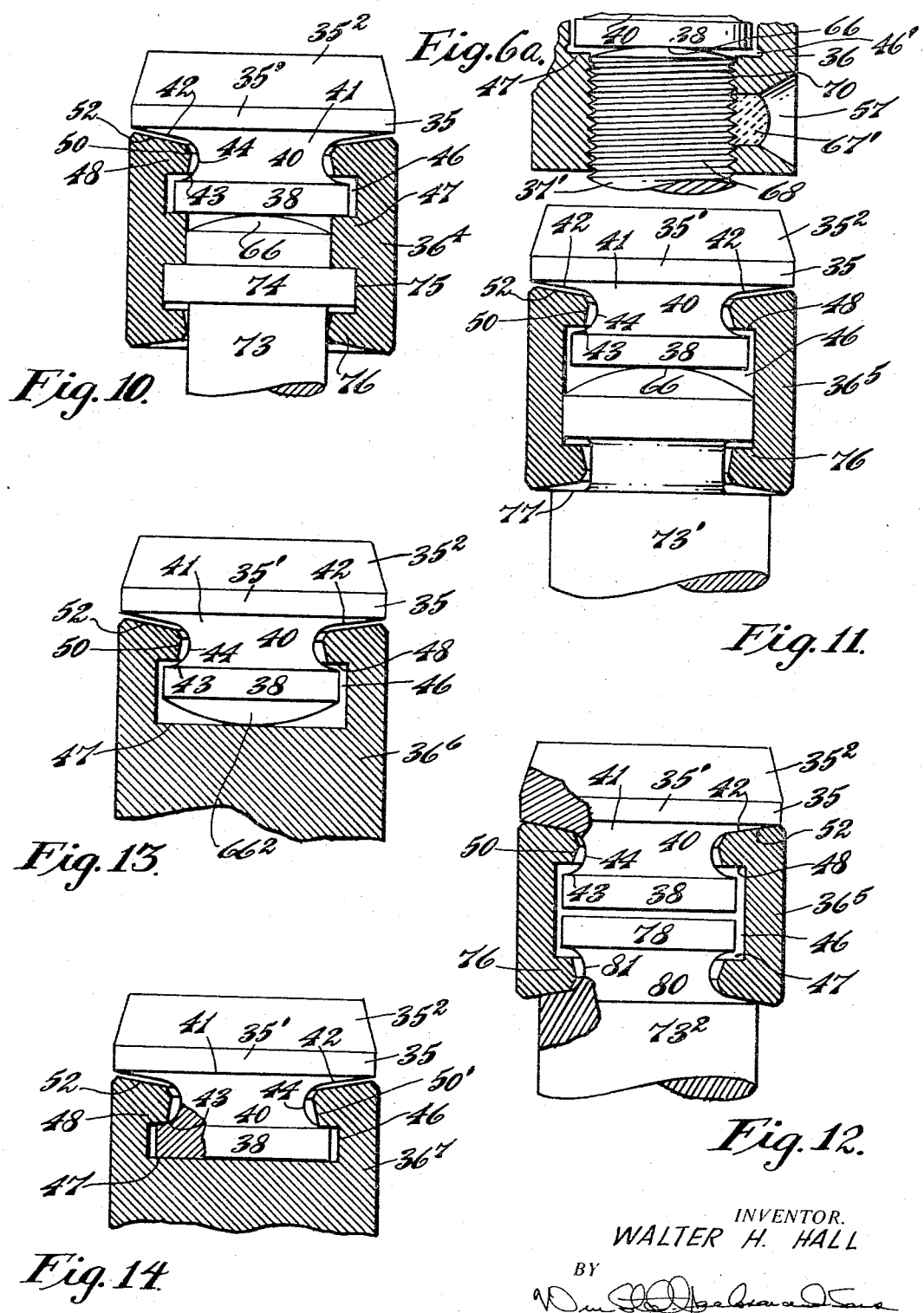

June 20, 1967        W. H. HALL        3,326,513

MEANS FOR INTERCONNECTING VALVE MEMBERS

Filed Nov. 10, 1964        4 Sheets-Sheet 4

INVENTOR.
Walter H. Hall
BY
ATTORNEYS

United States Patent Office 3,326,513
Patented June 20, 1967

3,326,513
MEANS FOR INTERCONNECTING
VALVE MEMBERS
Walter H. Hall, Cheltenham, Pa., assignor to Yarway Corporation, Philadelphia, Pa., a corporation of Pennsylvania
Filed Nov. 10, 1964, Ser. No. 410,163
2 Claims. (Cl. 251—86)

The present invention relates to improved valves and to methods of making the same.

A purpose of the invention is to improve the interconnection between valve members subjected to longitudinal force in operation of the valve, by providing an annular groove on one of the members and an annular lip in another member extended into the annular groove, and to form the lip so that it will function as a Belleville spring in resisting longitudinal force which might tend to separate the members.

A further purpose is to surround the lip of a valve member by a housing wall which will restrain the lip against deformation outward sufficient to permit the members to separate.

A further purpose is to increase the resistance tending to retain valve members together to resist longitudinal pull which would separate the valve members.

A further purpose is to provide a dished end surface on a lip of a valve member extended into an annular groove in another valve member and to make the wall of the groove adjoining the dished end surface conform to the dished end surface of the lip.

A further purpose is to obtain streamlined flow along valve members by minimizing the discontinuity of the valve members at the point at which they are joined.

A further purpose is to reduce turbining (continuous rotation produced by fluid) and reduce wear on a valve element by obtaining a favorable flow relation at the point of joining of the valve element with another valve part.

A further purpose is to provide a controllable clearance between valve elements which will permit one to rotate with respect to the other and also to be self-centering.

A further purpose is to permit a plug valve element to self-center and provide immediately behind the center thereof, a portion of a sphere in contact between the valve element and the surface behind the valve element. Thus, one surface may be a plane and the other a portion of a sphere or similar curved surface.

A further purpose is to permit positively locking two valve parts together by a means which resists separation more effectively.

A further purpose is to utilize the hoop stresses of the full retaining section as a means of retaining the valve member under conditions of extreme longitudinal detachment forces.

A further purpose is to in turn contain the retaining section within the bore of the valve housing and thus prevent disengagement by radial retainer movement.

A further purpose is to confine the inherent radial expansion resulting from application of detachment forces and, therefore, increase the resistance to detachment under the forces required to cause failure by bending, shear or crushing of the retaining lip section itself.

A further purpose is to provide for joining valve parts by a locking collar having an annular lip at each end formed into an annular groove with the section resembling a Belleville spring by reason of the fact that its end surface adjoining the member to which it is joined at each end is dished.

A further purpose is to make a joint between valve parts by providing one valve part with an annular groove and an adjoining annular flange, providing the other valve part with an outwardly flared portion having an inwardly projecting lip initially inclined toward an open end of the lip member to interrelate the parts so that the flange is in a recess beyond the lip of the lip member, forcing the parts through a die which first engages the lip member outside the lip, the cooperation between the lip member and the die being relieved forward of this engagement until advance of the lip member through the die has forced the lip inward, and then reversing the end surface of the lip so that the lip is dished to provide a Belleville spring form interconnection.

Further purposes appear in the specification and in the claims.

In the drawings I have chosen to illustrate a few only of the numerous embodiments in which the invention may appear, selecting the forms shown from the standpoints of convenience in illustration, satisfactory operation, and clear demonstration of the principles involved.

FIGURE 1 is a side elevation, partly in longitudinal section, through a plug type valve to which the principles of the invention have been applied.

FIGURE 2 is an enlarged fragment of FIGURE 1.

FIGURE 6a is a view corresponding to a portion of FIGURE 6 and showing a further modification in which the collar or retainer and stem or plunger are threaded together.

FIGURE 7 is a side elevation, partly in axial section, showing the operative parts of the collar or retainer formed integral with the valve stem.

FIGURE 8 is a side elevation, partly in axial section, showing a modification in the assembly of FIGURE 7, providing a portion of a spherical surface immediately behind the flange of the valve element to aid in self-centering.

FIGURE 9 is a view similar to FIGURE 8 of a modification in which a ball is provided for self-centering.

FIGURE 10 is a further modification of FIGURE 7, in which the collar or retainer is joined at both ends according to the invention, in one case connected to the valve element and in the other case connected to the valve plunger, there being a spherical surface on the end of the plunger to aid in self-centering.

FIGURE 11 is a further modification of the device of FIGURE 10, eliminating an annular rim on the inside of the collar.

FIGURE 12 is a further modification of FIGURE 10, omitting the spherical surface.

FIGURE 13 is a view similar to FIGURE 7 in which the spherical surface is provided on the end of the valve element adjoining the flange.

FIGURE 14 is a view similar to FIGURE 7 in which the valve element is tightly locked by the retainer.

Figure 4:
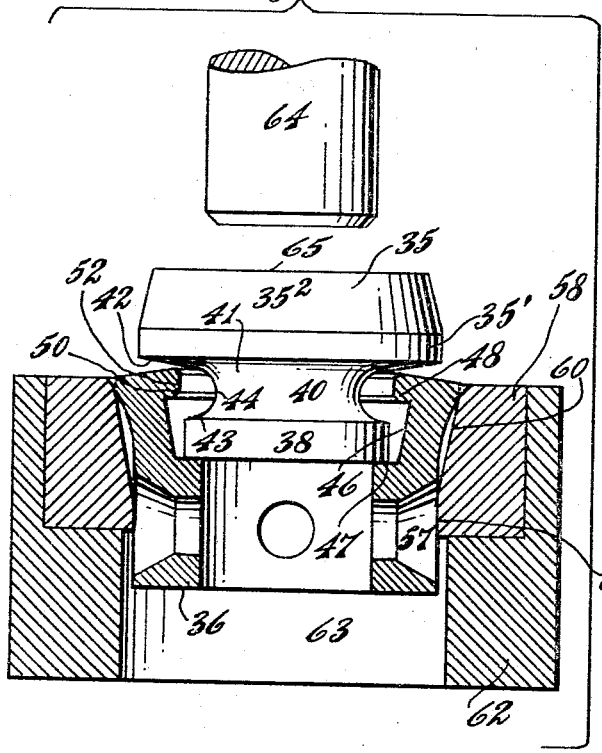
FIGURE 4 illustrates a step in the process of assembling the valve element and collar shown in FIGURE 3, the view showing the punch of the press broken away, and the die and collar or retainer in axial section prior to the beginning of forming.

Describing in illustration but not in limitation and referring to the drawings:

In valves such as hard seat valves used for example as blow-off valves, gage valves, and in seatless valves it is necessary to join together parts which are subject to longitudinal separating force or pull in operation of the valve. For example, if the valve employs a plug valve element engaging in a seat, the plug valve element must be dislodged from the seat and retracted in order to open the valve.

In many instances it is important that one of the joined elements, suitably the valve element, be capable of slight angular motion for self-centering, so that tight inter-connection often is not indicated.

In many valves, especially in the steel and chemical valve field, the valve parts are subjected to elevated temperatures, which introduce internal stresses which may complicate the problem of joining the parts in a manner that will provide adequate strength.

Various prior art attachments have been used to connect longitudinal parts of valves. One practice is to thread the parts together, providing a shoulder for engagement. Another technique is to interconnect by a pin or pins. These fasteners, however, limit relative angular motion about the longitudinal axis. In some cases ball bearings are inserted within a groove between the mating parts, permitting rotation. This, however, may be an expensive attachment. Valve discs have also been assembled in the past to collars or stems by metal forming or up-setting.

One of the difficulties which has arisen in the prior art up-setting techniques is that they have created a residual stress pattern which is unfavorable to development of maximum strength in the joint. Spring back is a factor, and the spring back in the prior art operates in a direction which tends to reduce the strength of the joint and is unfavorable to control of tolerance on the outside diameter.

The present invention joins valve parts subjected to longitudinally pulling force by forming or up-setting, but increases the resistance to separation and creates a favorable residual stress pattern by employing principles similar to those present in a Belleville spring.

In the preferred embodiment of the present invention, one valve element has a body, an annular flange at one end of the body and a neck between the flange and the body, with an annular groove between the flange and the body surrounding the neck. A retainer is employed which surrounds the flange and the neck and connects to said valve element. The retainer has a lip which extends into the groove and the lip has an annular end wall adjoining the body of the valve element which is dished and extends generally inwardly and toward the opposite wall of the groove. Thus a longitudinal force tending to separate the valve element and the retainer is resisted by the lip which is capable of resisting plastic deformation in a manner analogous to a Belleville spring.

Since the retainer can in many cases operate in a closely surrounding bore, and since operation of the parts under extreme resistance would force the retainer lip outward against the wall of the bore, the invention provides a failsafe feature since it is not possible to separate the parts without enlarging the bore.

Nothwithstanding this form of retention, the valve parts can be of conforming diameters, so that a valve element can be rotatable with respect to the retainer without causing turbining, or continuous rotation of the valve element when it is slightly free, which has been a cause of wear in the past. Streamline flow conditions are promoted by the invention.

The valve element itself need not be capable of undergoing plastic forming, and can be fabricated of wear-resistant materials including hard-facing alloys, as described in 1 Metals Handbook (8 ed. 1961) 820 (for example, Stellite No. 6), while the retainer can be formed of a suitable formable material, preferably a corrosion resisting alloy such as stainless steel of the straight chromium or chromium nickel type.

The fabrication of the parts is not subject to human error, since they can be forced through a die which will produce repetitive operations.

This combination of advantages makes the invention particularly applicable to valves for the control of fluids such as steam, water and chemicals. The invention is applicable in globe valves generally, and particularly in plug type and seatless valves, including steam boiler blow-off valves, gage valves, flow-control valves, and the like.

The method of attachment provides a positive interconnection that cannot become detached and is not likely to be loosened by wear. This can be made at very low cost.

One of the advantages of the invention is that it can provide seating contact of a valve disc with a valve stem member or the like near the outer periphery of the disc and in line with the seating area of the disc, when this is desirable.

In a plug valve the invention provides a chamfer of the retainer lip which is in line with or slightly inside the contact area of the plug valve with the seat.

These and other conditions favor uniformity of seating pressure around the circumference of the seat.

The invention also lends itself to transmitting pressure to a valve element at or adjacent to the axis by a ball or cylindrical surface which is most favorable to self-aligning of the valve element.

Considering now the drawings in detail, I illustrate in FIGURES 1 and 2 a plug valve 30 having a housing 31 provided with a seat 32 which may preferably have hard surfacing material, the seat being in communication when the valve is open with passages 33 and 34 for inlet and outlet. The valve seat is closed by a valve element 35 which is interconnected to a retainer 36 mounted in a suitable way as by plug welds 37 on a valve stem or plunger $37^1$ which moves in retraction in a valve stem fore $37^2$ slightly larger than the retainer and surrounding the retainer over part of the circumference even when the valve is seated. The valve stem at its upper end passes through a packing gland $37^3$ and has a threaded portion $37^4$ passing through a nut $37^5$ mounted on the housing 31. The stem is manipulated by handwheel $37^6$ to open and close the valve, as well known.

Figure 3:
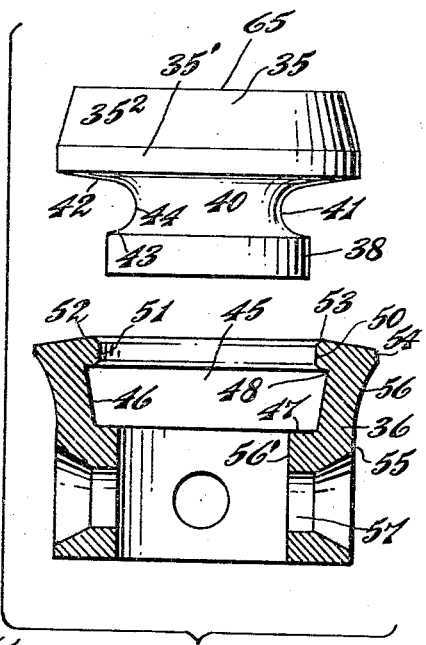
FIGURE 3 is an enlarged exploded side elevation, partly in axial section, showing a valve element and a collar or retainer illustrated in FIGURES 1 and 2 prior to assembly in accordance with the present invention.
Figure 5:
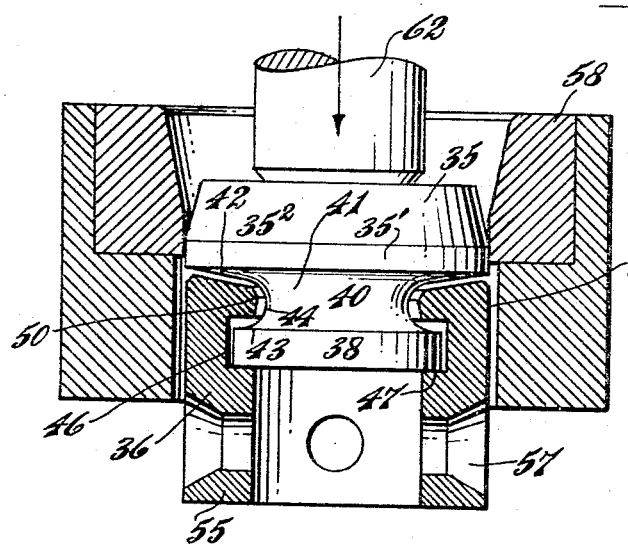
FIGURE 5 illustrates in axial section the press of FIGURE 4 with the punch further advanced, showing the collar or retainer completely assembled on the valve element.

As best seen in FIGURES 3, 4 and 5, the valve element 35 comprises a body $35^1$ and is provided with a truncated conical valve portion $35^2$ which seats on its conical surface.

At the opposite end of the valve element from the valve portion $35^2$ having the concial surface, there is an annular flange 38 which is interconnected with the body $35^1$ by a neck 40 and has surrounding the neck an annular groove 41.

It will be evident that all of the side surfaces of the valve element are surfaces of revolution.

The groove 41 has a tapering annular end wall 42 in the preferred embodiment whose angle when viewed in cross section is important in many of the applications of the invention, since it should in the preferred form conform to or when viewed in section in effect be paralled to the adjoining end wall of the retainer to be described. The opposite surface 43 of the groove is less critical and will conveniently be of a usual fillet which will guard against stress concentration, and the inner portion 44 of the groove should also preferably be curved to prevent stress concentration and will provide adequate clearance for the lip of the retainer to be described.

Retainer 36 in the form of the preferred embodiment shown in FIGURE 3 has a bore or socket 45 consisting of an interior annular groove 46 which terminates at one longitudinal end in a shoulder 47 and at the opposite longitudinal end has a shoulder 48. Suitable fillets will be provided at the corners.

Protruding inwardly beyond the groove 46 is a lip 50 which in the form of FIGURE 3 has an interior wall 51 larger than the outside diameter of the flange 38 on the plug valve. The lip has an end surface 52 which in the blank is at least transverse to the axis but preferably tapers suitably at a small angle to a line transverse to the axis, so that the end surface in the blank is more remote from the opposite end of the retainer at the inside than it is at the outside.

The lip on the blank and also the former retainer desirably are beveled at 53. The end surface 52 in the blank extends substantially to the radial outside of the blank, which has an outside annular wall portion 54 of maximum diameter at the outside of the lip. From the maximum outside diameter portion 54 to a uniform outside diameter shank 55 on the retainer, there is a gradually concavely curved outside portion 56 which as later explained is relieved so that it will not initially engage the die until substantial forming of the lip has taken place.

The shank 55 suitably has a reduced diameter bore 56' extending through it and a plug opening 57 extending radially into the bore for welding to attach to the stem as later explained.

In order to form the retainer or collar onto the valve element or disc, the lip angle of the end surface 52 is reversed by progressively forcing the retainer through a tapering die.

FIGURE 4 shows a die 58 of circular cross section having an initial, preferably straight, tapering portion 60 and a later generally uniform bore 61, mounted in a support 62 provided with an interior opening 63.

Initial contact between the die 58 and the retainer 36 is made at the portion of maximum diameter 54 on the outside of the lip and no contact is made with the intermediate portion 56 which is relieved or curved as shown.

With the retainer 36 in the die and its flaring end entering the tapering portion of the die, the valve element 35 is introduced at the groove portion 46 of the retainer with the flange 38 engaging the shoulder 47 as shown in FIGURE 4. The lip of the retainer is opposite the groove 41 in the valve element.

A cooperating punch 64 of the forming press (not shown) moves downward and engages the center of the end 65 of the valve element remote from the flange 38. Continued motion of the punch 64 causes the interior of the lip 50 to be pressed in compression and the entire retainer adjoining the lip and the groove 46 is reduced in diameter, and then the lip cross sectional element in effect rotates, going through the neutral axis and eventually reverses the direction of the end wall 52 of the lip 50 as shown in FIGURE 5 so that it is dished or tapered inwardly, being closer to the opposite end of the retainer 35 at the interior than at the exterior of the end surface 52.

In a convenient embodiment having a diameter at the inside of the die ranging from 1.600 inch to 1.475 inch, it was found that a force on the punch of 10 tons was sufficient to accomplish the forming operation, forcing the assembly through the die as shown in FIGURE 5.

Figure 4A:
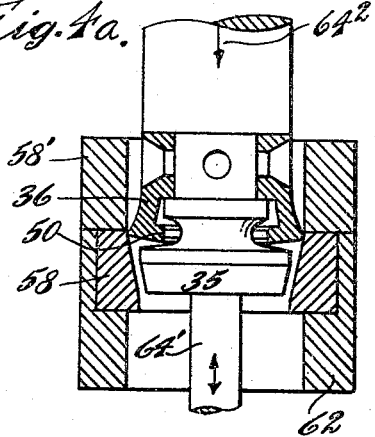
FIGURE 4a is a view similar to FIGURE 4 of the die and punch receiving the parts inverted.

FIGURE 4a shows the die 58 equipped with a guiding portion 58[1]. The retainer 36 and valve element 35 are assembled and inserted, with the valve element entering the die first and the valve element held against the retainer by a spring urged counterpunch 64[1] which yields as the punch 64[2] forces the retainer through the die 58 to form the lip 50 as described.

It will be noted that clearance is provided around the flange 38 in the groove 46 after forming but that the flange can engage the shoulder 47 to provide peripheral support. There is freedom between the walls of the groove 41 and the surfaces of the lip 50 to provide for self-centering action of the valve element in the valve seat.

Figure 6:
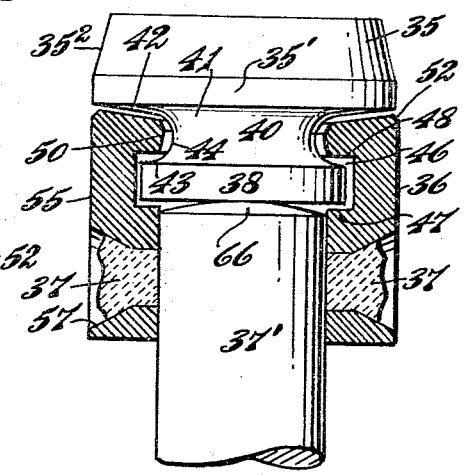
FIGURE 6 is an axial section showing the attachment of the collar or retainer to a valve stem or plunger.

The retainer and valve are suitably assembled on the stem or plunger 38 as shown in FIGURE 6. The end of the stem has surface 66 formed like a portion of a sphere or other suitable convex curve so that engagement and support are provided right under the center of the valve element. This affords self-centering seating of the valve member. If desired, peripheral support of the flange 38 at 47 can be obtained by lowering the stem supporting surface 66. However, as shown in FIGURE 6, engagement at the back of flange 38 is at the center only unless the valve element is misaligned. With the parts in this position suitable plug welds 37 are made to anchor the retainer on the plunger.

It should be noted however that as shown in FIGURE 6a the valve stem or plunger 37[1] can be threaded at 68 as shown in FIGURE 6a and the interior of the retainer threaded at 70 so that the exact longitudinal adjustment of the retainer with respect to the valve stem can be obtained to give proper support to the center of the valve element or if preferred also contact can be provided with the shoulder 47. The adjustment can then be fixed by inserting plug weld 37[1] in a suitable opening 57 extending radially through the retainer. Undercut 46' extending not more than 25% through the wall can be used to reduce stress concentration and reduce the likelihood of distortion of the retainer in the thread 70, or in the tubular shank.

In some cases it may be preferable to make the retainer and the stem integral, and such a combined retainer and stem is shown at 36[1] in FIGURE 7. If the retainer and the stem are to be made integral this can be accomplished as shown in FIGURE 8 without preventing the provision of a spherical surface behind the center of the valve element, by inserting in a somewhat elongated groove 46, a spherical button 66[1] having its highest point at the center, prior to forming, and then completing the forming of the lip 50 on a modified combined retainer and stem 36[2]. If preferred, the combined retainer and stem 36[3] of FIGURE 9 may be provided with a central recess 71 to receive a ball 72 which can if desired support the back of the flange 38 remote from the shoulders 47 to make the valve element more free for self-centering.

The retainer can be used to join the valve element to the stem as shown in FIGURES 10, 11 and 12. To accomplish this in FIGURE 10 the stem 73 is provided with a flange 74 which enters a groove 75 in a modified retainer 36[4]. The retainer is held on the flange 74 by wardly forming a lip 76 of the character of the lip previously described.

To accomplish this, the die may be capable of splitting to fit around the middle of the retainer and then closing the die, and the forming operation can be carried on then by pushing in one direction and later reversing, opening the die, inserting the parts, closing the die and pushing the retainer through the die in the opposite direction. With proper guiding of the components, they can be formed by following the procedure of FIGURE 4a.

The lip 76 and associate parts can desirably be substantially the same as the lip 50 and associated parts.

In FIGURE 11, the end of a valve stem 73[1] is annularly grooved at 77 to permit the insertion of a lip 76 on the opposite end of the retainer 36[5]. The lip 76 and associated parts will suitably be an opposite counterpart of the lip 50 and associated parts, formed in the same way.

In the form of FIGURE 12 a valve stem 73[2] is formed with an end flange 78 and intervening neck 80 and an outer groove 81 which are substantially the same as corresponding parts on the valve element 35. No spherical surface 66 is provided to engage behind the valves as in FIGURES 10 and 11, but a flat end surface on the flange 78 is adapted to be adjacent to a flat end surface on the flange 38 of the valve element. The lip 76 which joins the retainer 36⁵ to the valve stem is an opposite counterpart of the lip 50 which joins the retainer to the valve element. The valve element and valve stem in FIGURE 12 are shown separated from one another and from the interior of the retainer. However, spring back occurs to lips 50 and 76 so that self-centering of the components is obtained with intimate contact between the surfaces 42 and 52 on lips 50 or lips 76. This self-centering of the components provides for the transmissing of longitudinal forces through the intimate contact of the mating parts at their periphery where the greatest surface contact is obtained. Unlike some of the other forms this design resists rotation of the valve element.

If it is desired to have a spherical contact between the back of the valve element and the retainer, this can be done by providing a spherical surface 66² on the back of the flange 38 of the valve element to be held for self-centering by a retainer 36⁶ of FIGURE 13. In FIGURE 13 there is a clearance provided between the interior of the retainer and the exterior parts of the valve element for self-centering.

In FIGURE 14 an illustration is made of a retainer 36⁷ which has a lip 50¹ and a groove 46 which are so dimensioned that when the lip is formed inwardly as above described the lip allows no clearance for turning of the flange 38. Unlike the other forms where the valve element is free for self-centering, this form has no self-centering.

Figure 15:
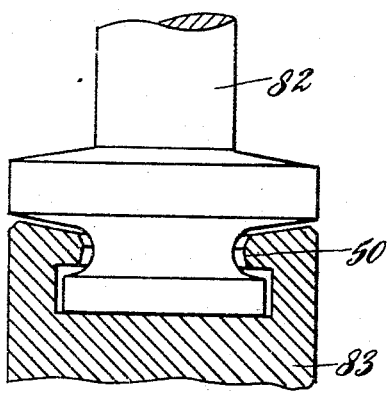
FIGURE 15 is a fragmentary axial section showing the use of the device of the invention to join a plunger to a valve stem.

In FIGURE 15 I illustrate valve stem 82 which is joined to a valve plunger 83 as shown in the invention, the intention being to illustrate that the principles of the invention can be applied in joining other valve elements which are subjected to longitudinal pull aside from merely plug valve elements and stems. The plunger 83 may optionally be solid or hollow as preferred.

In order to understand the advantages of the dished end wall of the lip as previously described, it is well to consider the comparison between a conventionally upset lip and the device of the invention. Longitudinal force applied to the joint and especially pulling force to dislodge a valve which is stuck to the seat are of particular concern.

Because of the fact that the lip initially engages the die only opposite the lip and is itself capable of being caused to in effect rotate in moving inwardly (as seen in section), the center of mass of the ring made by the lip and undergoing compressive stress is changed. There is of course predominance of outer material as compared to inner material in this retention ring when it is forced inwardly by the die, and this tends to develop a turning moment which moves the inner edge of the retaining ring or lip in a direction to form a dished end wall. The presence of the groove 46 and the narrower section of the wall of the retainer opposite this tends to promote slight inward turning of the lip portion with compression by reason of the lower energy absorption of the inward and downward force resultants of compression as compared to simple radial compression.

The result is that the inwardly and downwardly compressed lip section develops a residual stress opposing separation of the lip from the valve element, and this residual stress must be overcome before even elastic deformation can take place in the direction which would permit separation.

Figure 16:
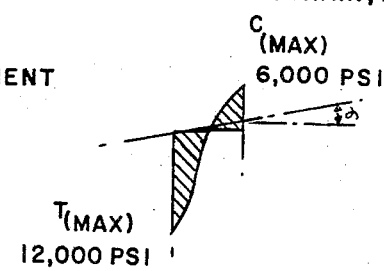
FIGURE 16 is a diagram showing the stress distribution in a convention rectangular lip formation.

If we consider a crude representation of a strictly conventional lip as shown in FIGURE 16, the die compresses the material inwardly from the dot-and-dash position and the material will assume a form generally as shown in the solid lines. Although the formation tends to move inwardly about a ring-like axis of rotation A, as it compresses inward, the heavy retaining lip section will tend to rotate slightly about B. This will result if the center of compression of the section is above the progressive line of contact with the die. Prior to the final formation, however, the forces are essentially radial and the springback and reaction are outward and opposite to the inward direction of the forming.

Figure 18:
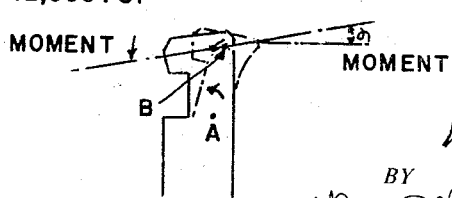
FIGURE 18 is a stress diagram showing the stress distribution in the dished lip of the present invention.

FIGURE 18 shows diagrammatically forming in accordance with the present invention where the lip first contacts the die and other portions of the retainer are relieved from the die. Here the metal swings about the center A as before but the center of compression of the lip is lowered so that the inward force of the die develops a moment for inward rotation of the section as it compresses. Since this turning about B is accomplished by reduction in the required degree of compression at the inside, which would be obtained by strictly lateral movement, this represents a lower energy state than mere radial compression and the retained internal stresses provide a moment favorable to retention of the valve element. Stated in other words, the difference in the energy of rotational work and that of higher radial compression represents approximately the margin of added retention since this work must be performed before detachment forces acting longitudinally on the assembly could bring it onto a comparable state of retention with the prior art. It will also be noticed that the retention moment increases with progress of the formation and that the margin of retention and engagement can be controlled by the design of the lip.

If we assume that the mean compression is uniform at approximately 8% up-set of the metal of the section and that the steel has yielded initially at 80,000 p.s.i. and has work hardened to 90,000 p.s.i. yield by reason of the compression in the die, the stress pattern during forming and after release from the die can be approximated. If the inside diameter of the ring section at the lip is $29/35$ of the outside diameter there, and the section is radially compressed, the stress on the outside diameter with respect to the stress on the inside diameter within the proportion limit of the material is $$35 S_O = 29 S_I$$

where $S_O$ is the unit hoop stress at the outside of the retention ring portion, and $S_I$ is the unit hoop stress at the inside of the retention ring portion Then $S_O = 29/35\ S_I$
$S_I = 1.2\ S_O$
$S_O = 0.83\ S_I$ This is based upon the assumption that the ring retaining section itself represents the primary stress distribution pattern.

Figure 17:
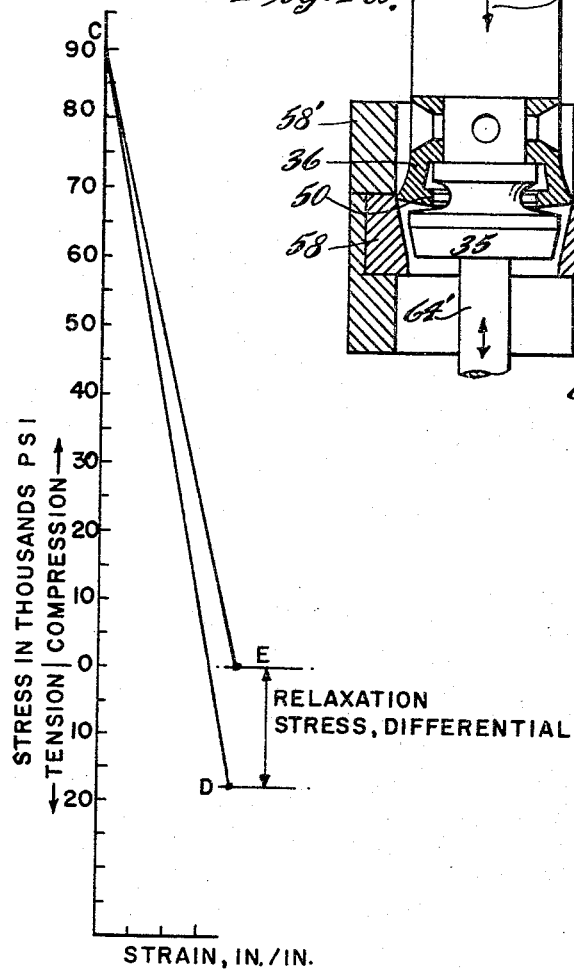
FIGURE 17 is a vector diagram useful for explaining the invention.

As the conventional section shown in FIGURE 17 is formed inward, the stress on the inside diameter will rise more rapidly until a yield stress is reached. Here the stress will level off and permanent deformation will begin accompanied by a gradual rise in stress as the material work hardens. The yield stress point will progress outwardly through the retention ring with diminishing gradient through the connecting section.

If we consider the case of a conventional lip section as shown in FIGURE 16, where the die mererly compresses it radially inward and uniformly around the circumference, the compressive yielding is fairly evenly distributed and the compression stress at the conclusion of forming in the die is reasonably uniform. When the retainer is removed from the die, however, the section is free to relieve elastic hoop stress and the outside diameter of the retention ring tends to expand as far as the restraint of the remainder of the section permits. Since the section is heavy, the inside diameter will tend to move radially outwardly at very nearly the same rate as the outside diameter and its relative strain and stress relief rates will be relatively higher than those on the outside diameter by reason of its smaller circumference. If the stress reduction starts from the compressive yield point, it follows that movement will take place until the residual stress in the section reaches a point of balance. Since the stress in the section drops more rapidly at the inside diameter than at the outside diameter and since the initial compressive stress is essentially uniform, the stress at the inside diameter will change from compression to tension as the outside diameter stress approaches zero. A balance will be reached when the tension forces at the inside of the retaining ring will be balanced by compression forces at the outside. The upper portion of FIGURE 16 shows stress distribution from inside to outside of a conventional retention ring portion in which the section in maximum tension at the inside is 0.8 as large as the section in maximum compression at the outside. This shows that at the outside the maximum compressive load is 8,000 p.s.i. and at the inside the maximum tension load is 10,000 p.s.i.

FIGURE 17 shows a residual stress pattern for a retainer of the present invention at the retention ring if the stress at the inside diameter is 1.2 times the stress of the outside diameter with a yield stress of 90,000 p.s.i. plotted as the ordinate and with strain in inches per inch plotted as abscissa. Point C represents the assumed maximum unit hoop stress in compression. Vector CD plots the relative relaxation rate of the inside portion of the retention ring in terms of unit hoop stress at the inside. Vector CE plots the relative relaxation rate for the outside portion of the retention ring in unit hoop stress when the retainer is free from the die. The distance DE represents the relaxation stress differential between the outside and the inside.

FIGURE 18 is an analysis similar to FIGURE 16, but for the residual stress in the retention ring portion of the device of the invention. Here the initial elastic deformation stress in the inside diameter rises faster than that at the outside diameter as in the case of FIGURE 16 and the initial yielding proceeds similarly. Due to the modified distribution of stress with a change in geometry of the section, however, a turning moment is established which tends to buckle the inside diameter portion as compression proceeds. This creates the dished end surface 52. After the yield peak, therefore, continued deformation follows a modified deformation curve which stores a minimum of cold working energy, but does so while storing up residual stress tending to oppose release of the joint formed. The curve shows a drooping inside diameter energy input but by reason of the capability of accommodating compression deformation metal at the upper part of the inside diameter with less restraint and with the accompaniment of an inside turning moment at the retention section. Upon removal of the retainer from the die, the stress distribution tends to increase tension stresses as shown at the inide of the retention ring indicated at the left of the upper diagram in FIGURE 18 and to provide a retention moment which must be overcome before release can be effectively started. Moreover, the compressive concentration on the upper side of the retention ring section serves to increase the amount of cold working and increase the yield strength where the stress concentration is greatest when a longitudinal pull is provided seeking release.

If the retaining ring rotates through an angle alpha the residual stress differential will develop a retaining moment which is proportional to sine alpha. Thus, if the angle alpha is 10°, the sine of the angle is 0.173 and tension and compression components which are effective to oppose the longitudinal pull will be $$C_T = 0.173 \times 12,000 = 2,076 \text{ p.s.i.}$$
$$C_C = 0.173 \times 6,000 = 1,038 \text{ p.s.i.}$$

For a case as set forth in FIGURE 18 where the section in maximum tension at the inside diameter is a half the section in maximum compression at the outside diameter, the above result will be obtained.

The advantage of the improved engagement can be visualized if we think of the forming operation as causing the end wall of the lip to reverse the direction in which it is dished or to flip in respect to its dishing. This flipping inward produces a lowered energy of formation as compared to radial compression but it represents added work which must be done on the parts before they can become detached by force which tends to overcome the radial deformation characteristics of the prior art. The strain relations are such as to counteract spring back and favor improved dimensional control of the outside clearance.

This flipping can be looked at as if the lip or retention ring were entirely separate from the rest of the retainer and were functioning as a dished spring washer or Belleville spring.

It will furthermore be noted that in an installation of the type shown in FIGURE 1 if the pull longitudinally were great enough to cause a reversal of the forming stress to recreate the shape of the blank of FIGURE 3, interference with the bore of the valve housing would prevent this from occurring.

If the lip 50 is extended inward sufficiently to approach contact with the neck 40 of the valve member and forces tending to disengage the parts are powerful enough to upset the lip and establish radial contact of the lip with the valve element, the whole lip and adjoining tubular wall section of the retainer will be subjected to hoop stress before the valve element can be released.

If in addition the clearance of the retainer at the outside from the valve housing is sufficiently small so that contact is established with increasing forces of disengagement, the retainer will be jammed between the valve housing and the neck of the valve element. Under such conditions the parts could not separate until the forces were sufficient to make the retainer lip fail by bending, shear or crushing.

Figure 19:
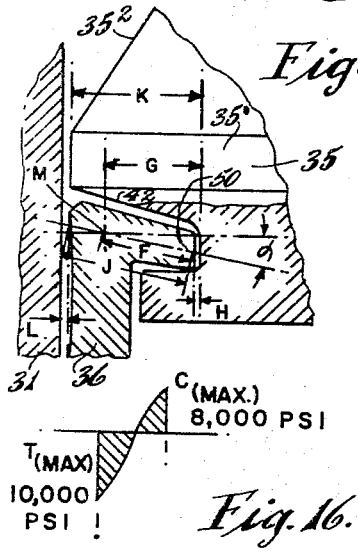
FIGURE 19 is a diagrammatic axial section showing how the parts resist separation.

FIGURE 19 shows such a valve assembly in which

F is the distance in the direction of the midline through the lip from the center of yielding rotation to the inner edge of the lip.

G is the radial distance from the center of yielding rotation to the inner edge of the lip.

H is the interior clearance of the lip.

J is the distance from the outside to the inside of the lip in the direction of the midline.

K is the radial distance between the inside and the outside of the lip.

L is the clearance between the lip and inside of the housing 31.

M is the center of yielding rotation.

It will be evident that if the distance F minus G is greater than the clearance H at the inside, the detachment forces if great enough will cause the retainer to engage the valve neck. If the angle of the midline of the lip to the radius is alpha, the distance F equals $$\frac{G}{\cos \alpha}$$

Thus, if $$\frac{G}{\cos \alpha} - G > H$$

binding will occur if the detachment forces are great enough at the inside to cause the lip to yield. If, in addition $$J - K > H + L$$

the retainer will expand and bind between the neck of the valve element on the inside and the bore of the housing at the outside. This would necessitate a great increase in forces which could cause failure as they would have to be great enough to bind, shear, or crush the retainer lip itself. Thus, the invention gives unusual protection against separation of the joint.

In view of my invention and disclosure variations and modifications to meet individual whim or particular need will doubtless become evident to other skilled in the art to obtain all or part of the benefits of my invention without copying the structure shown, and I therefore claim all such insofar as they fall within the reasonable spirit and scope of my claim.

Having thus described my invention what I claim as new and desire to secure by Letters Patent is:

1. In a valve, a valve element having a body, an annular flange at one end of the body, and a neck connecting the flange to the body, there being an annular groove between the flange and the body surrounding the neck, a retainer surrounding the flange and the neck and connected to the valve element, the retainer having a lip which extends into said groove but permits freedom for limited axial motion of said lip, the lip on the end of the retainer having an inwardly tapering annular end wall that faces the body side of the said annular groove in the valve element, said end wall being dished so that as it extends inwardly it extends toward the opposite wall of said groove, one wall of said groove adjoining said end wall of said lip conforming thereto to permit mutual engagement and support between said end wall of said lip and said adjoining wall of said groove, said valve body and said retainer being of similar outside diameter to promote streamline flow, said lip having residual stress therein resultant from its dished configuration which resists axial motion of said retainer with respect to said valve body, and said lip resisting like a Belleville spring longitudinal force tending to separate said retainer from said valve.

2. A valve of claim 1, in combination with a stem extending inside the retainer having an annular recess and a second lip on the retainer which is an opposite counterpart of the lip previously mentioned and which secures the stem to the retainer, the stem having a flange engaging behind the second lip.

References Cited
UNITED STATES PATENTS

| | | | |
|---|---|---|---|
| 244,804 | 7/1881 | Gillespie | 285—382 |
| 1,506,546 | 8/1924 | Oleson | 251—86 |
| 1,763,927 | 6/1930 | Ireland | 251—86 |

ALAN COHAN, *Primary Examiner.*

M. CARY NELSON, R. C. MILLER,
*Assistant Examiners.*